United States Patent

Duffey et al.

[15] 3,638,020
[45] Jan. 25, 1972

[54] MINERAL-DETECTION APPARATUS

[72] Inventors: Dick Duffey, Adelphi; Peter F. Wiggins, Annapolis; Frank E. Senftle, Chevy Chase, all of Md.

[73] Assignee: The United States of America as represented by the United States Atomic Energy Commission

[22] Filed: May 26, 1970

[21] Appl. No.: 40,644

[52] U.S. Cl. ................................. 250/83.3 R, 250/106 S
[51] Int. Cl. ................................................................ G01t 4/6
[58] Field of Search ............ 250/83.1, 83.3 R, 83.6 W, 106 S, 250/84.5

[56] References Cited

UNITED STATES PATENTS

| | | | |
|---|---|---|---|
| 3,256,434 | 6/1966 | Carver et al. | 250/106 S X |
| 3,463,922 | 8/1969 | Senftle et al. | 250/108 R X |
| 3,433,954 | 3/1969 | Bowman et al. | 250/51.5 X |

OTHER PUBLICATIONS

Fraenkel et al.; " Properties of the Alpha Particles Emitted in the Spontaneous Fission of $^{252}$Cf"; Physical Review Letters; Oct. 5, 1964; pp. 438– 441.

Primary Examiner—James W. Lawrence
Assistant Examiner—Davis L. Willis
Attorney—Roland A. Anderson

[57] ABSTRACT

A marine mineral-detection apparatus is described including a $^{252}$Cf source of neutrons and a lithium-drifted germanium radiation detector shielded from the neutron source. The neutron source is mounted on an extensible member supported within a mass of neutron-shielding material. The source is extended outside the neutron shield to bombard surrounding mineral values with neutrons. Elements capturing neutrons give off prompt gamma radiation with discrete energies. The radiation detector resolves the radiation into distinct energy peaks for identifying the elements present in the mineral values.

4 Claims, 2 Drawing Figures

PATENTED JAN 25 1972        3,638,020

INVENTORS
FRANK E. SENFTLE
BY DICK DUFFEY
PETER F. WIGGINS

ATTORNEY 3,638,020

MINERAL-DETECTION APPARATUS

BACKGROUND OF INVENTION

The present invention was made in the course of, or under, a contract with the United States Atomic Energy Commission.

FIELD OF THE INVENTION

The present invention relates to mineral exploration devices employing neutron activation analysis. This invention is particularly applicable to in situ exploration of the ocean floor where it is expected that mineral values are disseminated as relatively low-grade stratiform deposits. It may also have value in the general field of geochemical mapping.

Neutron activation analysis can be used in a variety of ways to identify unknown elements. One widely employed method is to convert the unknown element into a short-lived radioisotope and monitor the radiation resulting from radioactive decay. Gamma radiation originating in this manner will hereinafter be called activation or delayed gammas. Delayed gammas seldom have energy levels in excess of 1.5 mev. Thus the useful activated volume at the ocean floor is limited and widely disseminated or randomly scattered minerals may not be effectively detected from delayed gamma radiation. The presence of background radiation from natural emitters such as $^{40}K$ and the thorium-uranium series further complicate delayed gamma radiation measurements. More significantly the abundant sodium and chlorine in ocean waters are easily activated by neutron radiation and the decay of their activation products tend to mask radiation from less concentrated minerals.

Another form of analysis with neutrons relies on prompt gamma detection for identification of neutron bombarded elements. When an element captures neutrons a burst of capture gamma radiation is produced after about $10^{-14}$ to about $10^{-8}$ seconds but prior to radiation from any radioisotope decay. Generally, the slower neutrons are more likely to be captured by a given element. Spectra signatures including a plurality of capture gamma peaks with distinct energies can be determined for various elements and employed to identify these elements during mineral exploration. However, a gamma radiation detector with energy discrimination to a few hundredth of an mev. must be employed to obtain useful capture gamma signatures. Capture gammas are at energy levels as high as 9 mev. and therefore will reveal the minerals within a larger size sample than will delayed gammas which normally do not exceed about 1.5 mev.

Use of fast neutrons for mineral detection will produce gamma radiation from inelastic scattering reactions as will as capture gammas. Both of these types of radiation occur and diminish prior to delayed gammas and accordingly are generally termed prompt gammas. Inelastic scattering gammas may have some value in mineral identification but can blur or confuse capture gamma signatures. Consequently it is desirable to minimize the quantity of fast neutrons emitted from a neutron source employed for capture gamma spectroscopy.

DESCRIPTION OF PRIOR ART

Marine mineral exploration is presently accomplished by physically removing samples from on or beneath the ocean floor. One manner of obtaining samples is through use of hollow drill sections and recovery of the drill cores. Since many ocean minerals are believed to be in low concentration disseminated deposits, a large number of drill core samples at different locations may be required to determine if a mineral field warrants mining and recovery costs. Consequently, such sampling methods are time consuming and expensive.

In general, neutron activation analysis to date has been based on the detection of delayed gamma radiation in terrestrial mineral exploration. For example, see "Californium-25, Proceedings of a Symposium," pp. 321–346, sponsored by the New York metropolitan Section of the American Nuclear Society, Oct. 22, 1968, J. J. Barker, Ed. USAEC CONF–681032, Jan. 1969, Application of delayed gamma radiation techniques to marine mineral exploration would be subject to the foregoing disadvantages and difficulties.

SUMMARY OF INVENTION

Therefore, it is an object of the present invention to provide an in situ mineral detection apparatus.

It is also an object to provide a mineral detection apparatus which can examine a large volume sample in search of widely disseminated mineral values.

It is a further object to provide a marine mineral detection apparatus for locating deposits in the presence of background radiation and radiation from activated isotopes of sodium and chlorine.

In accordance with the present invention there is provided a $^{252}Cf$ source of neutrons mounted on an extensible member within a body of neutron-shielding material. The $^{252}Cf$ can be extended outside the shielding material to irradiate surrounding mineral values with neutrons. A lithium-drifted germanium crystal for radiation detection is spaced and shielded from the $^{252}Cf$ source. The crystal senses prompt gamma radiation produced by the irradiated mineral values with sufficient discrimination of energy peaks to define energy spectra signatures for element identification. The crystal is contacted and cooled by multiple heat-conduction bars submerged at one end opposite the crystal in a liquid refrigerant.

DETAILED DESCRIPTION OF THE PREFERRED EMBODIMENT

Figure 1:
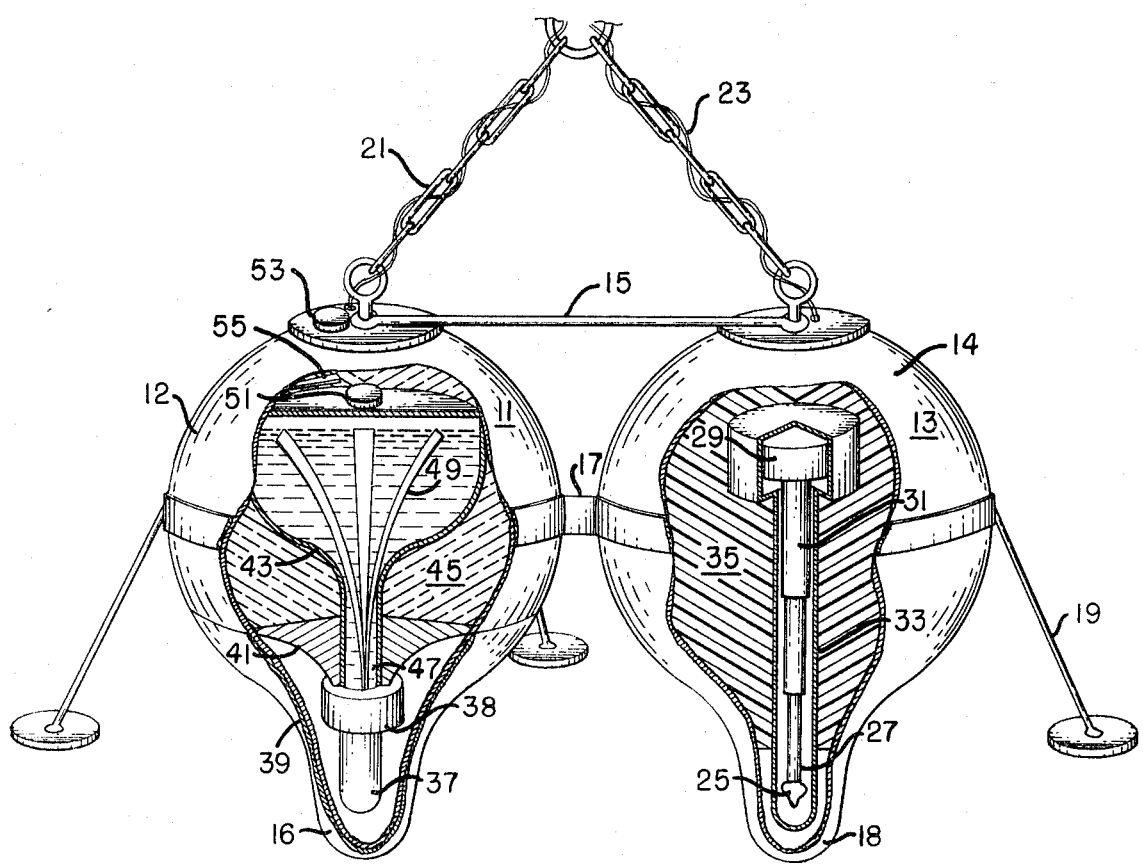
FIG. 1 is a partially cutaway perspective view of a mineral detection apparatus.

Referring now to FIG. 1, a gamma ray detection unit 11 and a neutron source unit 13 are shown rigidly connected together by a suitable rod 15 and interlocked bands 17. Units 11 and 13 are enclosed in generally spherically shaped housing 12 and 14, respectively. Both housings 12 and 14 have projection of reduced diameter 16 and 18, respectively, pointed downwardly for penetrating surface sediment. A plurality of legs 19 are attached to bands 17 to support the units 11 and 13 on the surface where they are to be used. Chains 21 are suitably attached to lower the units to the ocean floor and to provide a retainer for power cables 23 entering each unit.

The neutron source unit 13 includes an encapsulated Californium–252 neutron source 25. The $^{252}Cf$ undergoes spontaneous fission to produce a higher sustained neutron yield for a given source size than other known neutron sources. $^{252}Cf$ has an average neutron energy of 2.3 mev. such that with little moderation the quantity of inelastic scattering gammas produced by this neutron source are minimized and capture gamma signatures can be clearly obtained. It is therefore particularly well suited for use in a mobile mineral detection unit for seeking widely disseminated marine minerals. About 50 to 250 micrograms of $^{252}Cf$ is sufficient for the present application but larger or smaller amounts may be used to vary the neutron flux.

The $^{252}Cf$ is encapsulated in an impervious metal material to prevent loss of the valuable isotope. Suitable encapsulating materials include zirconium, niobium, and tantalum. These metals have insignificant capture gamma spectra and are chemically and physically compatible with $^{252}Cf$. Zirconium has only one relatively important capture gamma peak at 6.29 mev. while niobium has two peaks which are not very prominent and tantalum has no capture gamma peaks of importance. Nevertheless, niobium and tantalum absorb more neutrons and consequently their overall gamma ray emission is higher than that of zirconium. Therefore in regard to source background radiation, zirconium and zirconium alloys are the preferred encapsulating materials of the three metals mentioned as suitable.

The encapsulated $^{252}$Cf neutron source 25 is shown supported by an extensible member 27 in its extended position for irradiating surrounding mineral values in geologic strata. One manner os extending and retracting member 27 is to provide a reversible and rotary servomotor 29 driving a helically coupled telescoping shaft 31. Member 27 can be prevented from rotating with shaft 31 by a sliding pin and groove connection (not shown) between member 27 and a nearby stationary wall.

The $^{252}$Cf neutron source 25, extensible member 27, and the servomotor 29 are enclosed within an internal pressure vessel 33. Housing 14 may thereby be maintained at ambient pressure and thick exterior walls are unnecessary. Pressure vessel 33 and the walls of housing 14, especially the lower portions thereof, can be constructed of the recommended encapsulating materials or of a plastic such as fiberglass to limit capture gamma emissions from the construction materials. A hydrogenous neutron-shielding material 35, such as polyethylene, is provided in the remaining upper portion of housing 14 leaving the lower portion of projection 18 substantially free of neutron-shielding material. A thin layer of hydrogenous or other neutron-moderating material (not shown) can be placed on the inside walls of projection 18 to reduce the energy of neutron radiation if the surrounding water will not be an adequate moderator.

When storing or transferring the unit, the $^{252}$Cf is retracted into the upper central portion of vessel 33 and is substantially surrounded by a uniform thickness of shielding material 35 to limit radiation emission. When the unit is in position with projection 18 penetrating surface sediment, such as may be found on the ocean floor, the $^{252}$Cf is extended into the lower portion of projection 18 below shielding material 35 as shown. Surrounding geologic strata will thereby be irradiated with neutrons to produce capture gamma emissions from mineral values contained therein.

The gamma ray detection unit 11 includes a lithium-drifted germanium crystal 37 disposed in the hollow projection 16 of housing 12. Other radiation detectors having gamma energy resolution substantially equal to that of the Ge(Li) crystal might also be used, e.g., having gamma energy resolution to about 10 kev. for peaks in the mev. range. Crystal 37 is encapsulated in a cadmium and lithium shield to prevent damage resulting from neutron radiation. A preamplifier 38 sufficiently increases the electrical signal from crystal 37 for transmission to a recording pulse height analyzer and spectrometer (not shown) in a support vessel or vehicle.

A protective layer or coating of neutron-absorbing material 39 such as an aluminum-boron alloy is applied on the outside of housing 12. This protective layer prevents gamma interference resulting from neutron capture by the wall materials of housing 12. A layer of gamma shielding material 41, such as lead, is placed above the Ge(Li) crystal 37 to block background and capture gamma radiation originating above the unit.

A reservoir 43 of liquid nitrogen or other suitable refrigerant is disposed in the main body portion of housing 12. The refrigerant reservoir is spaced from the housing 12 wall to provide a peripheral chamber containing thermal insulation 45. Metal wires or fingers 49 extend in a passageway 47 from the Ge(Li) crystal 37 through the preamplifier 38 into refrigerant reservoir 43. The fingers transfer excess heat from the crystal 37 into the liquid refrigerant. The refrigerant is maintained at a constant boiling temperature by a pressure relief valve 51 in the wall of reservoir 43. The pressure inside housing 12 is maintained slightly above the outside pressure by a second pressure relief valve 53. Thus as the unit is lowered into the ocean the heat produced by the Ge(Li) crystal 37 provides pressurization in the peripheral chamber containing insulation 45 to prevent collapse of housing 12. Supplemental heaters and remote pressure-monitoring devices (not shown) may be provided to ensure sufficient pressure in housing 12.

An attitude indicator 55 is placed within housing 12 to transmit electrical signals indicating the orientation of the unit. The unit may thereby be positioned with the projections of reduced diameter 16 and 18 always pointed downwardly into the ocean bottom.

In one manner of operating the apparatus of the present invention for marine mineral exploration, the detector and associated electronics are calibrated on board the support vessel with capture gamma rays from pure materials. The unit is then further calibrated by lowering it into the water to identify prompt gamma ray peaks emitted by sodium and chlorine. Signals from the attitude indicator are then used to position the unit upright on the ocean floor with the projections of reduced diameter 16 and 18 penetrating the surface sediment. With the $^{252}$Cf source 25 extended, the signals from the Ge(Li) crystal are counted and recorded. The sea water spectrum can then be subtracted from that obtained at the ocean floor by raising the unit several feet about the surface and taking a second reading. The net spectral signatures thus read from the detector unit can be compared with known spectral signatures for suspected elements and the minerals in a particular location at the ocean bottom identified. Capture gamma signatures for several elements such as gold and manganese are given in the following publication by the inventors of the present mineral-detection apparatus: "Mineral Exploration of the Ocean Floor by In Situ Neutron Absorption Using A Californium–252 Source," Marine Technology Society Journal, Vol. 3, No. 5, pp. 9–16, Sept.–Oct. 1969. As explained in this publication, a spectral signature may comprise several capture gamma peaks at distinct energy levels. Interference from another element will probably only obscure one of the peaks making up the signature and the element is identifiable notwithstanding the interference. For instance, manganese emits capture gamma radiation with peaks at 6.04, 6.24, 6.55 and 6.65 mev. Chlorine has an interfering capture gamma peak at 6.64 mev., but manganese can still be identified from its remaining capture gamma peaks.

Figure 2:
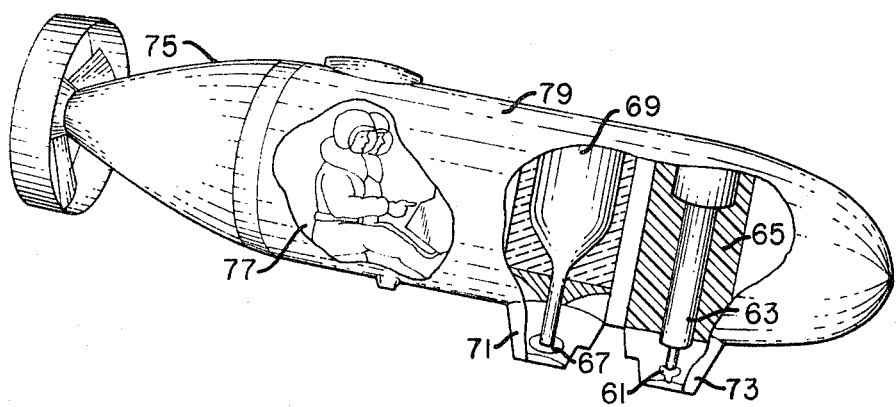
FIG. 2 is a partially cutaway perspective view of a submersible vehicle for lowering the mineral detection apparatus to the ocean floor.

Another embodiment of the present invention is shown in FIG. 2. A submersible vehicle is shown having a pair of hollow projection 71 and 73 extending from its bottom portion. A $^{252}$Cf source of neutrons 61 is mounted on an extensible member 63 for extending into and retracting from projection 73. Neutron-shielding material 65 surrounds the retracted position of the neutron source 61. A Ge(Li) radiation detector 67 is disposed within projection 71 for sensing prompt gamma radiation produced by neutron absorption into surrounding mineral values. A reservoir 69 of a liquid nitrogen provides refrigeration for cooling the detector.

The submersible vehicle also includes a propulsion unit 75, a compartment for operators 77 and a second compartment 79 for the associated electronics and data analyzer. The vehicle can proceed underwater to locations where minerals are suspected to occur. Projections 71 and 73 can penetrate into the surface sediment while the vehicle rests on the ocean floor and readings are taken. The submersible may then be easily moved to examine numerous other locations.

A mineral-detection apparatus has been described for marine mineral exploration. The apparatus is kept mobile by use of a small size but high yield $^{252}$Cf neutron source. This source irradiates a large sample of geologic strata to produce high-energy capture gamma radiation with minimum interfering gammas from inelastic scattering. A gamma radiation detector of high-energy resolution defines capture gamma spectra signatures with sufficient accuracy to identify minerals in the presence of activated sodium and chlorine as well as other background radiation occurring beneath the ocean surface.

We claim:

1. A marine mineral-detection apparatus which comprises, in combination:
   A. a first and a second housing member each having a generally spherically shaped portion and a projection of reduced diameter extending therefrom, and structural means for supporting said housing members in fixed spaced relationship with said projections of reduced diameter pointed towards a common direction in axially parallel alignment;

B. a neutron source unit disposed in said first housing member including
1. a $^{252}$Cf neutron source,
2. hydrogenous shielding material disposed in the generally spherically shaped portion of said first housing member, and
3. extensible means for supporting said $^{252}$Cf neutron source in a retracted position near the center of said hydrogenous shielding material, and in an extended position within said projection of reduced diameter of said first housing member to bombard surrounding geologic strata with neutrons;

C. a prompt gamma ray detector unit disposed in said second housing member including
1. a Li-drifted Ge crystal supported within the projection of reduced diameter of said second housing member for producing electrical pulses in response to prompt gamma radiation from mineral values within said geologic strata,
2. means disposed in the generally spherically shaped portion of said second housing member for cooling said detector, and
3. neutron-absorbing material disposed between said Li-drifted Ge crystal and said neutron source.

2. The apparatus of claim 1 wherein said neutron source unit includes a sealed elongated vessel, containing said extensible means and said $^{252}$Cf neutron source, mounted within said first housing member and extending into said projection of reduced diameter.

3. The mineral-detection apparatus of claim 1 wherein said cooling means includes
a. a closed reservoir of liquid refrigerant for cooling said crystal; and
b. pressure relief valves within the walls of said reservoir and said second housing member for discharging refrigerant gas and for maintaining said second housing at a pressure slightly greater than ambient pressure.

4. The mineral detection apparatus of claim 1 wherein said $^{252}$Cf neutron source is encapsulated in a material selected from the group consisting of tantalum, niobium, zirconium and alloys thereof.

* * * * *